(12) United States Patent
Morinaga

(10) Patent No.: US 11,764,375 B2
(45) Date of Patent: Sep. 19, 2023

(54) FUEL CELL SYSTEM, CONTROL DEVICE, AND MOBILE BODY

(71) Applicant: TOYOTA JIDOSHA KABUSHIKI KAISHA, Toyota (JP)

(72) Inventor: Rei Morinaga, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 17/651,866

(22) Filed: Feb. 21, 2022

(65) Prior Publication Data

US 2022/0271311 A1  Aug. 25, 2022

(30) Foreign Application Priority Data

Feb. 24, 2021  (JP) .................... 2021-027250

(51) Int. Cl.
*H01M 8/04* (2016.01)
*H01M 8/04746* (2016.01)
*B60L 58/30* (2019.01)
*H01M 8/04313* (2016.01)

(52) U.S. Cl.
CPC ......... *H01M 8/04753* (2013.01); *B60L 58/30* (2019.02); *H01M 8/04313* (2013.01); *H01M 8/04776* (2013.01); *B60L 2240/12* (2013.01); *H01M 2220/20* (2013.01)

(58) Field of Classification Search
CPC ......... H01M 8/04753; H01M 8/04313; H01M 8/04776; H01M 2220/20; B60L 58/30; B60L 2240/12

USPC ....................................................... 429/444
See application file for complete search history.

(56) References Cited

U.S. PATENT DOCUMENTS

| 2006/0003205 | A1* | 1/2006 | Yoshida ............ H01M 8/04402 429/432 |
|---|---|---|---|
| 2010/0239934 | A1 | 9/2010 | Bono |
| 2011/0076584 | A1 | 3/2011 | Katano |
| 2015/0086894 | A1 | 3/2015 | Ueda et al. |
| 2018/0226666 | A1 | 8/2018 | Kaneko |
| 2019/0198900 | A1 | 6/2019 | Ohashi |

(Continued)

FOREIGN PATENT DOCUMENTS

| JP | 2006006088 A | 1/2006 |
|---|---|---|
| JP | 2007299691 A | 11/2007 |

(Continued)

*Primary Examiner* — James M Erwin
(74) *Attorney, Agent, or Firm* — Dickinson Wright, PLLC

(57) ABSTRACT

A fuel cell system for a mobile body includes a fuel cell, an oxidant gas supply system, and a controller. The oxidant gas supply system includes an air compressor. The air compressor includes a rotor, an air bearing, and a housing. The controller includes a movement speed detector configured to measure a movement speed of the mobile body, and an acceleration detector configured to predict an acceleration to be applied to the mobile body. The controller is configured to determine whether the acceleration predicted by the acceleration detector is equal to or higher than a predetermined acceleration threshold, and control a rotation speed of the air compressor to be equal to or higher than a predetermined first rotation speed when determination is made that the acceleration predicted by the acceleration detector is equal to or higher than the acceleration threshold.

14 Claims, 3 Drawing Sheets

(56) References Cited

U.S. PATENT DOCUMENTS

| | | |
|---|---|---|
| 2020/0274176 A1 | 8/2020 | Shiokawa et al. |
| 2020/0295385 A1 | 9/2020 | Nozaki |
| 2021/0188125 A1* | 6/2021 | Zhao .................. H01M 10/486 |

FOREIGN PATENT DOCUMENTS

| | | | |
|---|---|---|---|
| JP | 2020149778 A | 9/2020 | |
| WO | 2013157488 A1 | 10/2013 | |

* cited by examiner

FUEL CELL SYSTEM, CONTROL DEVICE, AND MOBILE BODY

CROSS-REFERENCE TO RELATED APPLICATION

This application claims priority to Japanese Patent Application No. 2021-027250 filed on Feb. 24, 2021, incorporated herein by reference in its entirety.

BACKGROUND

1. Technical Field

The present disclosure relates to a fuel cell system, a control device, and a mobile body.

2. Description of Related Art

A fuel cell is a power generation device that extracts electric energy by electrochemical reaction of a fuel gas such as hydrogen and an oxidant gas such as oxygen from a single cell (may hereinafter be referred to as "cell") or a fuel cell stack (may hereinafter be referred to simply as "stack") that is a stack of a plurality of single cells. The fuel gas and the oxidant gas that are actually supplied to the fuel cell are often a mixture with a gas that does not contribute to oxidation and reduction. In particular, the oxidant gas is often air containing oxygen.

The fuel gas and the oxidant gas may hereinafter be referred to simply as "reaction gases" or "gases" without particular distinction. Both the single cell and the fuel cell stack that is a stack of single cells may be referred to as "fuel cell". The single cell of the fuel cell generally includes a membrane electrode assembly (MEA). The membrane electrode assembly has a structure in which a catalyst layer and a gas diffusion layer (GDL; may hereinafter be referred to simply as "diffusion layer") are formed in this order on each side of a solid polymer electrolyte membrane (hereinafter also referred to simply as "electrolyte membrane"). Thus, the membrane electrode assembly may be referred to as "membrane electrode gas diffusion layer assembly (MEGA)". The single cell includes two separators that sandwich both sides of the membrane electrode gas diffusion layer assembly if necessary. The separator generally has a structure in which a groove serving as a channel of the reaction gas is formed on a surface in contact with the gas diffusion layer. This separator has electron conductivity and also functions as a collector of generated electricity.

At a fuel electrode (anode) of the fuel cell, hydrogen ($H_2$) serving as the fuel gas and supplied from a gas channel and the gas diffusion layer is protonated by catalytic action of the catalyst layer, and passes through the electrolyte membrane to move to an oxidant electrode (cathode). Electrons generated at the same time work through an external circuit and move to the cathode. Oxygen ($O_2$) serving as the oxidant gas and supplied to the cathode reacts with protons and electrons in the catalyst layer of the cathode to generate water. The generated water gives moderate humidity to the electrolyte membrane, and excess water permeates the gas diffusion layer and is discharged to the outside of the system.

Various studies have been conducted on fuel cell systems to be used in mobile bodies such as fuel cell vehicles (may hereinafter be referred to as "vehicles"). For example, Japanese Unexamined Patent Application Publication No. 2007-299691 (JP 2007-299691 A) discloses a fuel cell system that uses, in order to reduce power consumption of air compressors at the minimum rotation speed, an air compressor having a small capacity when requested electric power is small and an air compressor having a large capacity when the requested electric power is large.

Japanese Unexamined Patent Application Publication No. 2020-149778 (JP 2020-149778 A) discloses a vehicle including a control device configured to control operations of a compressor. The compressor includes an air bearing. The control device drives the compressor regardless of whether a fuel cell is generating electricity.

International Publication No. 2013/157488 (WO 2013/157488 A) discloses a fuel cell system including means for increasing an air pressure via pressure regulating means when an actual flow rate is higher than a target flow rate in a minimum rotation speed range in which a rotary shaft is able to be rotatably supported by an air bearing, and oxidant flow control means for controlling the ratio of flows in a humidifier and a humidifier bypass. The target flow rate and a target pressure are set based on a requested current value from a fuel cell. When the actual flow rate is higher than the target flow rate, a predetermined value is added to the set target pressure to set a new target pressure.

SUMMARY

When the output from the fuel cell that is requested by the fuel cell system is smaller than a predetermined value, the necessary amount of oxidant gas to the fuel cell decreases. Therefore, the rotation speed of a motor of the air compressor (ACP) serving as an oxidant gas supply device is generally reduced. To achieve downsizing, higher durability, higher power, and higher efficiency of the motor of the air compressor, there is a movement afoot to adopt an air bearing in the motor unit. An air compressor using the air bearing has a mechanism in which an air flow is generated between a rotor (rotator) and a housing by rotating the rotor to float the rotor. Therefore, a predetermined rotation speed (minimum rotation speed) or higher is needed to float the rotor even when the requested output from the fuel cell is small. The air compressor using the air bearing requires a large amount of electric power to float the air bearing. Therefore, there is a need to reduce the rotation speed of the air compressor to improve fuel efficiency when the requested output from the fuel cell is small.

In JP 2007-299691 A, it is necessary to provide two large and small air compressors, which is a disadvantageous factor in a limited mounting space of the vehicle. Therefore, there may be taken an approach of controlling the rotation speed of one air compressor based on the requested output. When setting the rotation speed, a margin rotation speed higher than the minimum rotation speed needs to be taken into consideration in addition to the power consumption to attenuate a G-force (meaning an acceleration in the present disclosure) applied in forward, rearward, rightward, and leftward directions of the vehicle during driving so that the rotor and the housing do not come into contact with each other due to the acceleration G. In the air compressor including the air bearing, there is no idea of switching the rotation speed depending on the acceleration G from the outside. When this idea is incorporated, there is no allowance to switch the rotation speed after the acceleration G is applied from the outside. For example, in the need to increase the rotation speed because the acceleration G is applied when the rotation speed is low, the acceleration G cannot be attenuated and the rotor and the housing may come into contact with each other to damage the air compressor.

The present disclosure provides a fuel cell system capable of improving the durability of an air compressor.

One aspect of the present disclosure provides a fuel cell system for a mobile body. The fuel cell system includes a fuel cell, an oxidant gas supply system configured to supply an oxidant gas to the fuel cell, and a controller. The oxidant gas supply system includes an air compressor. The air compressor includes a rotor, an air bearing, and a housing. The controller includes a movement speed detector configured to measure a movement speed of the mobile body. The controller includes an acceleration detector configured to predict an acceleration G to be applied to the mobile body. The controller is configured to determine whether the acceleration predicted by the acceleration detector is equal to or higher than a predetermined acceleration threshold, and control a rotation speed of the air compressor to be equal to or higher than a predetermined first rotation speed when determination is made that the acceleration G predicted by the acceleration detector is equal to or higher than the acceleration threshold.

In the fuel cell system of the present disclosure, the controller may be configured to determine whether the rotation speed of the air compressor is equal to or higher than a predetermined second rotation speed and lower than the first rotation speed, determine whether the acceleration predicted by the acceleration detector is equal to or higher than the acceleration threshold when determination is made that the rotation speed of the air compressor is equal to or higher than the second rotation speed and lower than the first rotation speed, control the rotation speed of the air compressor to be equal to or higher than the first rotation speed when determination is made that the acceleration predicted by the acceleration detector is equal to or higher than the acceleration threshold, and control the rotation speed of the air compressor to be the second rotation speed when determination is made that the acceleration G predicted by the acceleration detector is lower than the acceleration threshold.

In the fuel cell system of the present disclosure, the controller may be configured to determine whether the movement speed of the mobile body that is measured by the movement speed detector is lower than a predetermined first movement speed, control the rotation speed of the air compressor to be equal to or higher than the first rotation speed when determination is made that the movement speed is equal to or higher than the first movement speed, determine whether the acceleration G predicted by the acceleration detector is equal to or higher than the acceleration threshold when determination is made that the movement speed is lower than the first movement speed, and control the rotation speed of the air compressor to be equal to or higher than the first rotation speed when determination is made that the acceleration predicted by the acceleration detector is equal to or higher than the acceleration threshold.

In the fuel cell system of the present disclosure, the controller may be configured to determine whether the movement speed is equal to or higher than a predetermined second movement speed lower than the first movement speed when determination is made that the acceleration predicted by the acceleration detector is lower than the acceleration threshold, control the rotation speed of the air compressor to be a predetermined third rotation speed lower than the first rotation speed when determination is made that the movement speed is equal to or higher than the second movement speed, and control the rotation speed of the air compressor to be a predetermined second rotation speed lower than the third rotation speed when determination is made that the movement speed is lower than the second movement speed.

In the fuel cell system of the present disclosure, the second rotation speed may be a minimum rotation speed of the air compressor that is necessary when the mobile body is stopped.

In the fuel cell system of the present disclosure, the third rotation speed may be a rotation speed of the air compressor that is necessary when the movement speed of the mobile body is equal to or higher than the second movement speed and lower than the first movement speed.

Another aspect of the present disclosure provides a control device for a fuel cell system including a fuel cell and an oxidant gas supply system including an air compressor and configured to supply an oxidant gas to the fuel cell. The fuel cell system is mountable on a mobile body. The control device includes a movement speed detector configured to measure a movement speed of the mobile body, and an acceleration detector configured to predict an acceleration to be applied to the mobile body. The control device is configured to determine whether the acceleration predicted by the acceleration detector is equal to or higher than a predetermined acceleration threshold, and control a rotation speed of the air compressor to be equal to or higher than a predetermined first rotation speed when determination is made that the acceleration predicted by the acceleration detector is equal to or higher than the acceleration threshold.

Another aspect of the present disclosure provides a mobile body including the fuel cell system described above.

Another aspect of the present disclosure provides a mobile body including the control device described above.

According to the fuel cell system of the present disclosure, it is possible to improve the durability of the air compressor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
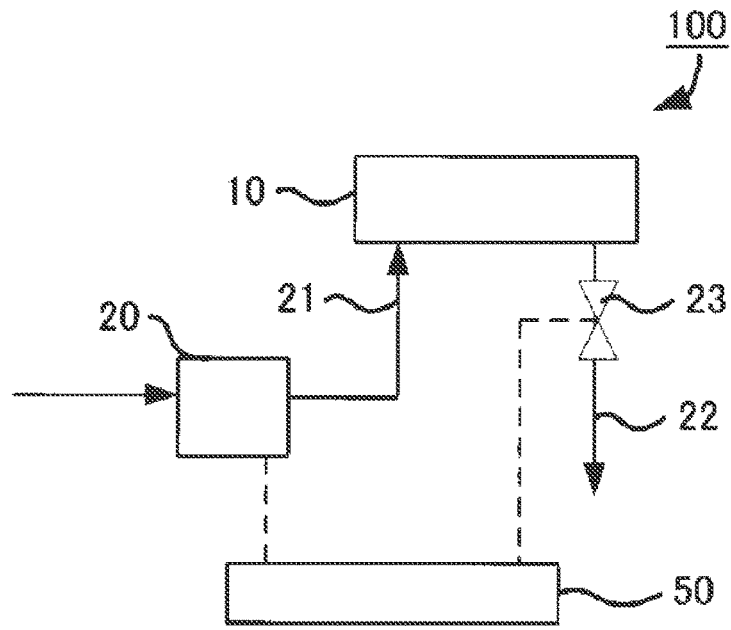
FIG. 1 is a schematic configuration diagram illustrating an example of a fuel cell system of the present disclosure.

A fuel cell system of the present disclosure is a fuel cell system for a mobile body. The fuel cell system includes a fuel cell, an oxidant gas supply system configured to supply an oxidant gas to the fuel cell, and a controller. The oxidant gas supply system includes an air compressor. The air compressor includes a rotor, an air bearing, and a housing. The controller includes a movement speed detector configured to measure a movement speed of the mobile body. The controller includes an acceleration detector configured to predict an acceleration G to be applied to the mobile body. The controller is configured to determine whether the acceleration G predicted by the acceleration detector is equal to or higher than a predetermined acceleration threshold G1. The controller is configured to control a rotation speed of the air compressor to be equal to or higher than a predetermined first rotation speed R1 when determination is made that the acceleration G predicted by the acceleration detector is equal to or higher than the acceleration threshold G1.

In the air compressor, an idle rotation speed when the mobile body is moving (when the movement speed is other than 0 km/hr) is, for example, 20,000 to 30,000 revolutions, and a rotation speed when the mobile body is stopped (seating rotation speed) is, for example, 10,000 to 20,000 revolutions. There is a margin between the rotation speeds. This rotation speed margin is provided to keep an air bearing capacity against the acceleration G from the outside in addition to control variations and sensor variations of a flow rate sensor, a pressure sensor, a temperature sensor, an atmospheric pressure sensor, and the like, and prevent damage due to contact of the rotor with the housing along with an insufficient attenuation amount of the acceleration G. When the mobile body is a vehicle, preconditions for generation of the acceleration G include a rough road, a wavy road, road surface interference, minor collision, high-speed collision, and the like. Regarding the high-speed collision, when the fuel cell is damaged by an actual collision, consideration may be made as to whether to replace components. When the vehicle is stopped (when the movement speed is 0 km/hr), the rough road, the wavy road, and the road surface interference are excluded from the preconditions. Therefore, it is necessary to prevent the damage to the air compressor due to the contact of the rotor with the housing along with the insufficient attenuation amount of the G-force when the minor collision (for example, 25 G or less) occurs while the vehicle is stopped (when the movement speed is 0 km/hr).

In the related art, the minor collision is detected by a G-force sensor provided in a vehicle electronic control unit (ECU), and then the rotation speed of the air compressor is increased from the rotation speed when the vehicle is stopped to the idle rotation speed when the vehicle is moving. After the minor collision is detected, deficiency of the air bearing capacity cannot be prevented due to problems about a communication delay and a response of the air compressor (time difference from command to response). This is because the influence of minor collision detection on the air compressor is on the order of several tens of msec, while the communication speed and the response speed of the air compressor are on the order of 100 msec. With the action taken after the minor collision detection, there is no allowance to prevent the damage to the air compressor. If the air bearing capacity is increased, the minimum rotation speed of the air compressor when the vehicle is moving can be reduced, but the rotation speed of the air compressor cannot further be reduced when the vehicle is stopped. Thus, the fuel efficiency of the mobile body decreases.

In the fuel cell system of the present disclosure, the minor collision of the mobile body is predicted by using the acceleration detector. When determination is made that the minor collision is likely to occur, the rotation speed of the air compressor is increased from the rotation speed when the mobile body is stopped to the rotation speed when the mobile body is moving. As a result, it is possible to secure the rotation speed necessary for the air bearing to absorb the force generated by the influence of the acceleration G so that the rotor and the housing of the air compressor do not come into contact with each other. Therefore, in the fuel cell system of the present disclosure, the requested output from the fuel cell and the acceleration G from the outside can be taken into consideration with the single air compressor. Thus, it is possible to improve the fuel efficiency of the mobile body and suppress the damage to the air compressor due to the contact of the rotor with the housing along with the insufficient capacity of the air bearing. In the fuel cell system of the present disclosure, it is possible to improve the fuel efficiency of the mobile body and reduce noise and vibration due to the air compressor without additional components.

FIG. 1 is a schematic configuration diagram illustrating an example of a fuel cell system of the present disclosure. A fuel cell system 100 illustrated in FIG. 1 includes a fuel cell 10, an air compressor 20, an oxidant gas supply channel 21, an oxidant off-gas discharge channel 22, an oxidant gas pressure regulating valve 23, and a controller 50. FIG. 1 illustrates only an oxidant gas supply system. Illustration of a fuel gas system, a cooling system, and the like is omitted. The controller 50 is electrically connected to the air compressor 20 and the oxidant gas pressure regulating valve 23, and controls their drive.

The fuel cell system of the present disclosure is used for a mobile body. The mobile body is not particularly limited as long as the mobile body includes a fuel cell and is driven by electric power of the fuel cell. Examples of the mobile body include vehicles such as a fuel cell vehicle, flying objects such as a drone, ships, railway vehicles, and construction machinery. The mobile body may include the fuel cell system of the present disclosure.

The fuel cell system of the present disclosure includes the fuel cell, the oxidant gas supply system, and the controller.

The fuel cell may have only a single cell, or may be a fuel cell stack that is a stack of a plurality of single cells. The number of stacked single cells is not particularly limited, and may be, for example, 2 to several hundreds or 2 to 300. The fuel cell stack may include end plates at both ends of the single cell in a stacking direction.

The single cell of the fuel cell includes at least a membrane electrode gas diffusion layer assembly. The membrane electrode gas diffusion layer assembly has an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer. The anode (fuel electrode) includes the anode catalyst layer and the anode-side gas diffusion layer. The cathode catalyst layer and the anode catalyst layer are collectively referred to as "catalyst layers". For example, the catalyst layer may include a catalyst metal that promotes electrochemical reaction, an electrolyte having proton conductivity, and a support having electron conductivity. Examples of the catalyst metal include platinum (Pt) and an alloy composed of Pt and another metal (for example, a Pt alloy in which cobalt, nickel, or the like is mixed). The electrolyte may be a fluororesin or the like. Examples of the fluororesin include a Nafion solution. The catalyst metal is supported on a support. In each catalyst layer, the support that supports the catalyst metal (catalyst support) may be mixed with the electrolyte. Examples of the support that supports the catalyst metal include commercially available carbon materials.

The cathode-side gas diffusion layer and the anode-side gas diffusion layer are collectively referred to as "gas diffusion layers". For example, the gas diffusion layer may be a conductive member having gas permeability. Examples of the conductive member include a carbon porous body such as carbon cloth and carbon paper, and a metal porous body such as a metal mesh and a foamed metal.

The electrolyte membrane may be a solid polymer electrolyte membrane. Examples of the solid polymer electrolyte membrane include a fluorine-based electrolyte membrane such as a thin film of perfluorosulfonic acid containing moisture, and a hydrocarbon-based electrolyte membrane. Examples of the electrolyte membrane include a Nafion membrane (manufactured by DuPont).

The single cell may include two separators that sandwich both sides of the membrane electrode gas diffusion layer assembly if necessary. One of the two separators is an anode-side separator and the other is a cathode-side separator. In the present disclosure, the anode-side separator and the cathode-side separator are collectively referred to as "separators". The separator may have a supply hole and a discharge hole through which the reaction gas and a coolant flow in the stacking direction of the single cell. Examples of the coolant include a mixed solution of ethylene glycol and water to prevent freezing at a low temperature. Examples of the supply hole include a fuel gas supply hole, an oxidant gas supply hole, and a coolant supply hole. Examples of the discharge hole include a fuel gas discharge hole, an oxidant gas discharge hole, and a coolant discharge hole. The separator may have one or more fuel gas supply holes, one or more oxidant gas supply holes, one or more coolant supply holes, one or more fuel gas discharge holes, one or more oxidant gas discharge holes, or one or more coolant discharge holes.

The separator may have a reaction gas channel on a surface in contact with the gas diffusion layer. The separator may have a coolant channel for keeping a constant temperature of the fuel cell on a surface opposite to the surface in contact with the gas diffusion layer. When the separator is the anode-side separator, the separator may have one or more fuel gas supply holes, one or more oxidant gas supply holes, one or more coolant supply holes, one or more fuel gas discharge holes, one or more oxidant gas discharge holes, or one or more coolant discharge holes. The anode-side separator may have, on a surface in contact with the anode-side gas diffusion layer, a fuel gas channel through which the fuel gas flows from the fuel gas supply hole to the fuel gas discharge hole. The anode-side separator may have, on a surface opposite to the surface in contact with the anode-side gas diffusion layer, a coolant channel through which the coolant flows from the coolant supply hole to the coolant discharge hole.

When the separator is the cathode-side separator, the separator may have one or more fuel gas supply holes, one or more oxidant gas supply holes, one or more coolant supply holes, one or more fuel gas discharge holes, one or more oxidant gas discharge holes, or one or more coolant discharge holes. The cathode-side separator may have, on a surface in contact with the cathode-side gas diffusion layer, an oxidant gas channel through which the oxidant gas flows from the oxidant gas supply hole to the oxidant gas discharge hole. The cathode-side separator may have, on a surface opposite to the surface in contact with the cathode-side gas diffusion layer, a coolant channel through which the coolant flows from the coolant supply hole to the coolant discharge hole. The separator may be a gas-impermeable conductive member or the like. Examples of the conductive member include dense carbon obtained by compressing carbon to have gas impermeability, and a press-formed metal (for example, iron, aluminum, or stainless steel) plate. The separator may have a current collecting function.

The fuel cell stack may have a manifold such as an inlet manifold with which each supply hole is in communication and an outlet manifold with which each discharge hole is in communication. Examples of the inlet manifold include an anode inlet manifold, a cathode inlet manifold, and a coolant inlet manifold. Examples of the outlet manifold include an anode outlet manifold, a cathode outlet manifold, and a coolant outlet manifold.

In the present disclosure, the fuel gas and the oxidant gas are collectively referred to as "reaction gases". The reaction gas to be supplied to the anode is the fuel gas. The reaction gas to be supplied to the cathode is the oxidant gas. The fuel gas is a gas mainly containing hydrogen. The fuel gas may be hydrogen. The oxidant gas may be oxygen, air, dry air, or the like.

The oxidant gas supply system supplies the oxidant gas to the fuel cell. Specifically, the oxidant gas supply system supplies the oxidant gas to the cathode of the fuel cell. The oxidant gas supply system includes the air compressor. The air compressor includes a rotor, an air bearing, and a housing. The air compressor is electrically connected to the controller. The rotation speed of the rotor of the air compressor is controlled based on a control signal from the controller.

The oxidant gas supply system may include the oxidant gas supply channel. The oxidant gas supply channel connects the air compressor and an oxidant gas inlet of the fuel cell. The oxidant gas supply channel allows the supply of the oxidant gas from the air compressor to the cathode of the fuel cell. The oxidant gas inlet may be the oxidant gas supply hole, the cathode inlet manifold, or the like.

The oxidant gas supply system may include the oxidant off-gas discharge channel. The oxidant off-gas discharge channel is connected to an oxidant gas outlet of the fuel cell. The oxidant off-gas discharge channel allows discharge of an oxidant off-gas to the outside. The oxidant off-gas is the oxidant gas discharged from the cathode of the fuel cell. The oxidant gas outlet may be the oxidant gas discharge hole, the cathode outlet manifold, or the like. The oxidant gas pressure regulating valve may be provided in the oxidant off-gas discharge channel. The oxidant gas pressure regulating valve is electrically connected to the controller. The oxidant gas pressure regulating valve is opened by the controller to discharge the oxidant off-gas that is the reacted oxidant gas to the outside from the oxidant off-gas discharge channel. By adjusting the opening degree of the oxidant gas pressure regulating valve, an oxidant gas pressure (cathode pressure) to be supplied to the cathode may be regulated.

The oxidant gas supply system may include a bypass channel that branches from the oxidant gas supply channel, bypasses the fuel cell, and connects to the oxidant off-gas discharge channel. A bypass valve may be arranged in the bypass channel. The bypass valve is electrically connected to the controller. The bypass valve is opened by the controller to bypass the fuel cell and discharge the oxidant gas to the outside from the oxidant off-gas discharge channel when the oxidant gas need not be supplied to the fuel cell.

The oxidant gas supply system may include a pressure sensor. The pressure sensor detects a pressure in the oxidant gas supply system. The pressure sensor is electrically connected to the controller. The controller may estimate a rotation speed of the air compressor based on the pressure detected by the pressure sensor. The pressure sensor may be arranged downstream of the air compressor in the oxidant gas supply channel. A known pressure gauge or the like can be adopted as the pressure sensor.

The oxidant gas supply system may include a temperature sensor. The temperature sensor detects a temperature of the fuel cell. The temperature of the fuel cell may be a temperature of the coolant flowing through the fuel cell. The temperature sensor is electrically connected to the controller. The controller may estimate a rotation speed of the air compressor based on the temperature of the fuel cell that is detected by the temperature sensor. The temperature sensor may be arranged downstream of the air compressor in the oxidant gas supply channel. A known thermometer or the like can be adopted as the temperature sensor.

The oxidant gas supply system may include a flow rate sensor. The flow rate sensor detects a flow rate of the oxidant gas in the oxidant gas supply system. The flow rate sensor is electrically connected to the controller. The controller may estimate a rotation speed of the air compressor based on the flow rate of the oxidant gas that is detected by the flow rate sensor. The flow rate sensor may be arranged upstream of the air compressor in the oxidant gas supply channel. A known flowmeter or the like can be adopted as the flow rate sensor.

The fuel cell system may include a fuel gas supply unit, a fuel gas supply channel, or a fuel off-gas discharge channel as the fuel gas system of the fuel cell. The fuel gas supply unit supplies the fuel gas to the fuel cell. Specifically, the fuel gas supply unit supplies the fuel gas to the anode of the fuel cell. Examples of the fuel gas supply unit include a fuel tank. Specific examples of the fuel gas supply unit include a liquid hydrogen tank and a compressed hydrogen tank. The fuel gas supply unit is electrically connected to the controller. The fuel gas supply unit may control ON/OFF of the fuel gas supply by controlling opening and closing of a main check valve of the fuel gas supply unit in response to a control signal from the controller. The fuel gas supply channel connects a fuel gas inlet of the fuel cell and the fuel gas supply unit. The fuel gas supply channel allows the supply of the fuel gas to the anode of the fuel cell. The fuel gas inlet may be the fuel gas supply hole, the anode inlet manifold, or the like. The fuel off-gas discharge channel may be connected to a fuel gas outlet of the fuel cell.

The fuel off-gas discharge channel discharges a fuel off-gas to the outside. The fuel off-gas is the fuel gas discharged from the anode of the fuel cell. The fuel gas outlet may be the fuel gas discharge hole, the anode outlet manifold, or the like. The fuel off-gas discharge channel may be provided with a fuel off-gas discharge valve (exhaust/drain valve). The fuel off-gas discharge valve allows discharge of the fuel off-gas and water to the outside (outside the system). The outside may be the outside of the fuel cell system or the outside of the mobile body. The fuel off-gas discharge valve may electrically be connected to the controller. A flow rate of discharge of the fuel off-gas to the outside may be adjusted by controlling opening and closing of the fuel off-gas discharge valve by the controller. A fuel gas pressure (anode pressure) to be supplied to the anode may be regulated by adjusting the opening degree of the fuel off-gas discharge valve. The fuel off-gas may contain the fuel gas that has passed unreacted at the anode, and water that is generated at the cathode and reaches the anode. The fuel off-gas may contain a corrosive substance generated at the catalyst layer, the electrolyte membrane, or the like, and the oxidant gas that may be supplied to the anode while scavenging air.

The fuel cell system may include a coolant supply unit or a coolant circulation channel as the cooling system of the fuel cell. The coolant circulation channel communicates with the coolant supply hole and the coolant discharge hole in the fuel cell, and allows circulation of the coolant supplied from the coolant supply unit inside and outside the fuel cell. The coolant supply unit is electrically connected to the controller. The coolant supply unit is driven in response to a control signal from the controller. In the coolant supply unit, the flow rate of the coolant to be supplied from the coolant supply unit to the fuel cell is controlled by the controller. With this control, the temperature of the fuel cell may be controlled. Examples of the coolant supply unit include a coolant pump. The coolant circulation channel may be provided with a radiator that radiates heat of the coolant. The coolant circulation channel may be provided with a reserve tank that stores the coolant.

The fuel cell system may include a secondary battery. The secondary battery (battery) may be any rechargeable battery. Examples of the secondary battery include known secondary batteries such as a nickel-metal hydride secondary battery and a lithium ion secondary battery. The secondary battery may include a power storage element such as an electric double layer capacitor. A plurality of secondary batteries may be connected in series. The secondary battery supplies electric power to the air compressor or the like. The secondary battery may be chargeable by a power supply outside the mobile body, such as a household power supply. The secondary battery may be charged with electric power output from the fuel cell. The charging and discharging of the secondary battery may be controlled by the controller.

For example, the controller physically includes an arithmetic processing unit such as a central processing unit (CPU), a storage device such as a read-only memory (ROM) that stores control programs and control data to be processed by the CPU and a random access memory (RAM) to be mainly used as various work areas for control processes, and an input/output interface. The controller may be a control device such as an electronic control unit (ECU). The controller may electrically be connected to an ignition switch that may be mounted on the mobile body such as a vehicle. The controller may be operable by an external power supply even if the ignition switch is OFF.

The controller includes a movement speed detector that measures a movement speed of the mobile body. A known speed meter or the like can be adopted as the movement speed detector. When the mobile body is a vehicle, an accelerator operation amount may be regarded as the movement speed, and the movement speed detector may be an accelerator operation amount detector. A known accelerator operation amount sensor or the like can be adopted as the accelerator operation amount detector.

The controller includes an acceleration detector that predicts an acceleration G to be applied to the mobile body. An ultrasonic sensor for use as, for example, a corner sensor or a clearance sensor, a millimeter wave sensor, a camera, a three-dimensional light detection and ranging (3D-LIDAR) sensor, or a combination of those devices may be adopted as the acceleration detector. The acceleration detector may be an ultrasonic sensor or a camera from the viewpoint of reducing costs.

Figure 2:
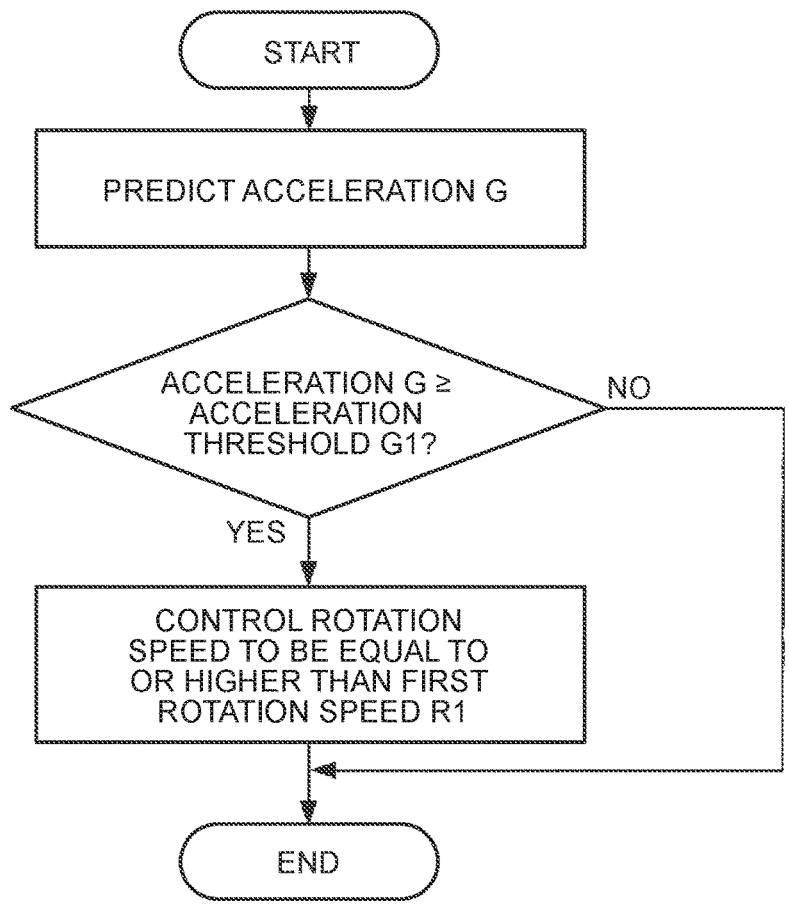
FIG. 2 is a flowchart illustrating an example of control of the fuel cell system of the present disclosure.

FIG. 2 is a flowchart illustrating an example of control of the fuel cell system of the present disclosure. The acceleration detector predicts an acceleration G. The acceleration G may be predicted constantly while the fuel cell system is activated, specifically, while the ignition switch of the mobile body is ON (IG-ON) or the mobile body is moving. The acceleration G may be predicted repeatedly at predetermined time intervals. The controller determines whether the acceleration G predicted by the acceleration detector is equal to or higher than a predetermined acceleration threshold G1. When the controller determines that the acceleration G predicted by the acceleration detector is equal to or higher than the acceleration threshold G1, the controller controls the rotation speed of the air compressor to be equal to or higher than a predetermined first rotation speed R1. Then, the control may be terminated or repeated from the beginning. The timing to execute the second and subsequent control after the first control is not particularly limited. The control may be repeated constantly or at predetermined time intervals.

The acceleration threshold G1 may be a value indicating prediction of minor collision. The minor collision may occur at, for example, an acceleration G of 25 m/s² or lower. When the mobile body is a vehicle, the acceleration threshold G1 may be a value indicating that the vehicle is predicted to travel through a rough road or a wavy road, a value indicating that the vehicle is predicted to undergo road surface interference, or a value indicating prediction of minor collision. As preconditions for generation of the acceleration G, these values may be stored in the controller as a dataset of acceleration thresholds G1 corresponding to the individual cases.

The first rotation speed R1 may be a rotation speed of the air compressor that is necessary when the mobile body is not stopped, that is, when the movement speed of the mobile body is not zero. The first rotation speed R1 may be a rotation speed of the air compressor that is necessary when the movement speed of the mobile body is equal to or higher than a predetermined slow speed. The first rotation speed R1 may be a rotation speed of the air compressor that is necessary when the movement speed of the mobile body is higher than the predetermined slow speed. The first rotation speed R1 may be a rotation speed of the air compressor that is necessary when the mobile body is in normal operation. The first rotation speed R1 may be a rotation speed of the air compressor that is necessary when the mobile body is operating at a speed higher than a normal operation speed. The slow speed is a speed at which the mobile body can be stopped immediately, and may be, for example, 10 km/h or lower or 5 km/h or lower. The movement speed when the mobile body is in normal operation may be a speed higher than the predetermined slow speed. When the mobile body is a vehicle, the mobile body may be operating at a speed higher than the normal operation speed, for example, while the mobile body is traveling on an expressway. When the mobile body is a vehicle, the movement speed when the mobile body is operating at a high speed may be, for example, 80 km/h or higher or 100 km/h or higher. A dataset indicating a relationship between the acceleration G and a rotation speed of the air compressor that is necessary to attenuate the acceleration G to keep the rotor and the housing out of contact with each other may be prepared in advance. The first rotation speed R1 may be set from the dataset.

In the control illustrated in FIG. 2, for example, when a minor collision from the outside is predicted on the mobile body, the rotation speed of the air compressor is increased before the minor collision to be equal to or higher than the rotation speed necessary when the mobile body is moving. Therefore, the acceleration G applied at the time of minor collision can be attenuated sufficiently, thereby suppressing damage to the air compressor.

Figure 3:
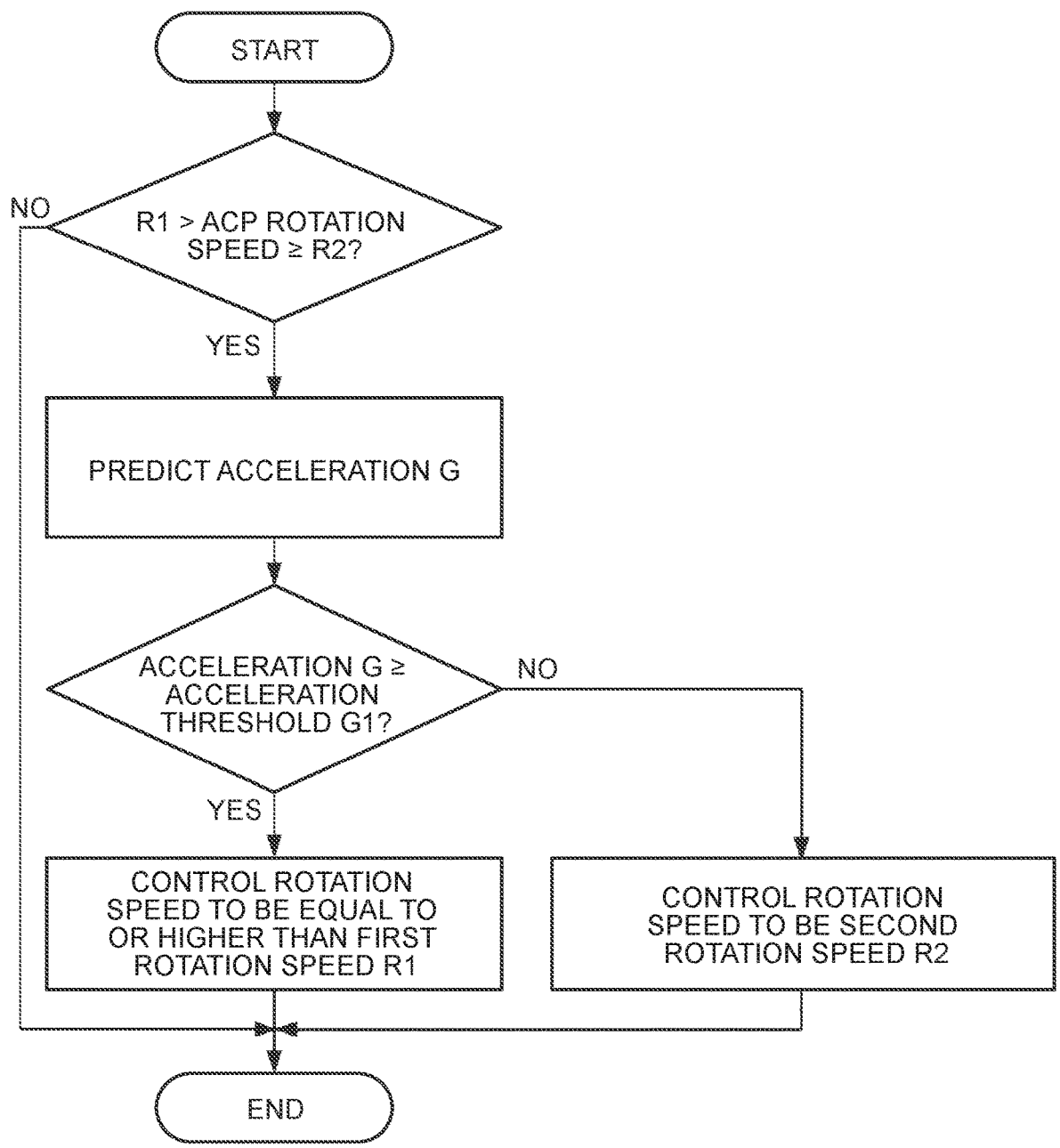
FIG. 3 is a flowchart illustrating another example of the control of the fuel cell system of the present disclosure.

FIG. 3 is a flowchart illustrating another example of the control of the fuel cell system of the present disclosure. The controller determines whether the rotation speed of the air compressor is equal to or higher than a predetermined second rotation speed R2 and lower than the first rotation speed R1. When the controller determines that the rotation speed of the air compressor is not equal to or higher than the second rotation speed R2 and lower than the first rotation speed R1, that is, when the controller determines that the rotation speed of the air compressor is equal to or higher than the first rotation speed R1, the controller may terminate the control. When the controller determines that the rotation speed of the air compressor is equal to or higher than the second rotation speed R2 and lower than the first rotation speed R1, the acceleration detector predicts an acceleration G. The controller determines whether the acceleration G predicted by the acceleration detector is equal to or higher than the acceleration threshold G1. When the controller determines that the acceleration G predicted by the acceleration detector is equal to or higher than the acceleration threshold G1, the controller controls the rotation speed of the air compressor to be equal to or higher than the first rotation speed R1. When the controller determines that the acceleration G predicted by the acceleration detector is lower than the acceleration threshold G1, the controller controls the rotation speed of the air compressor to be a second rotation speed R2. Then, the control may be terminated or repeated from the beginning. The timing to execute the second and subsequent control after the first control is not particularly limited. The control may be repeated constantly or at predetermined time intervals.

The second rotation speed R2 may be a minimum rotation speed of the air compressor that is necessary when the mobile body is stopped. In this case, the first rotation speed R1 may be a minimum rotation speed of the air compressor that is necessary when the mobile body is not stopped. The minimum rotation speed of the air compressor that is necessary when the mobile body is stopped may be set as appropriate depending on the performance of the air compressor, and may be 10,000 revolutions or more or 20,000 revolutions or more. The minimum rotation speed of the air compressor that is necessary when the mobile body is not stopped may be set as appropriate depending on the performance of the air compressor, and is not particularly limited as long as this minimum rotation speed is higher than the minimum rotation speed of the air compressor that is necessary when the mobile body is stopped. This minimum rotation speed may be 30,000 revolutions or more or 40,000 revolutions or more.

In the control illustrated in FIG. 3, for example, when a minor collision from the outside is predicted on the mobile body while the mobile body is stopped or is approximate to the stopped state, the acceleration G cannot sufficiently be attenuated at the time of minor collision with the rotation speed of the air compressor remaining equal to or higher than the rotation speed when the mobile body is stopped and lower than the rotation speed when the mobile body is moving. Therefore, the rotor and the housing may come into contact with each other to damage the air compressor. When the minor collision from the outside is predicted, the rotation speed of the air compressor is increased before the minor collision to be equal to or higher than the rotation speed of the air compressor that is necessary when the mobile body is moving. Therefore, the acceleration G applied at the time of minor collision can be attenuated sufficiently, thereby suppressing damage to the air compressor. When the minor collision from the outside is not predicted, the rotation speed of the air compressor is controlled to be the minimum rotation speed of the air compressor that is necessary when the mobile body is stopped from the viewpoint of improving the fuel efficiency of the fuel cell. When the mobile body is a vehicle, the mobile body may be approximate to the stopped state, for example, in a case where the gear is set in a parking range.

As an example of the minor collision, another vehicle at 30 km/hr causes the minor collision with the driver's vehicle while the driver's vehicle is idling in a parking lot (the vehicle speed is 0 km/hr but the ignition is ON). In this case, a period required to increase the rotation speed from the minimum rotation speed of the air compressor when the driver's vehicle is stopped to the minimum rotation speed of the air compressor when the driver's vehicle is moving is assumed to be 100 msec with a communication delay. A collision with another vehicle is predicted and the rotation speed of the air compressor is increased before the distance from the other vehicle reaches 0.83 m or smaller. At the moment of the collision, the rotation speed of the air compressor can be increased to be equal to or higher than the minimum rotation speed of the air compressor when the driver's vehicle is moving.

Figure 4:
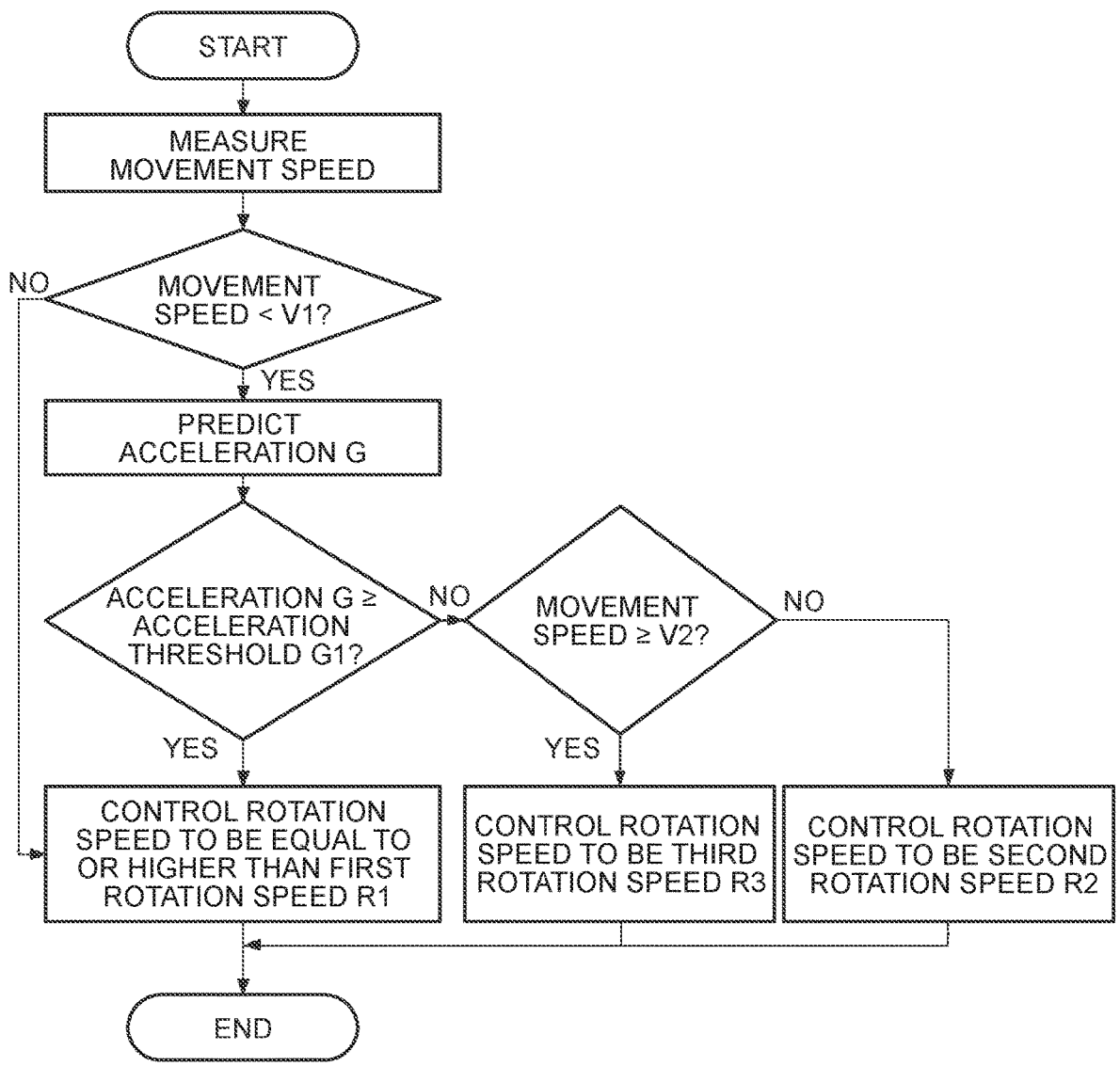
FIG. 4 is a flowchart illustrating another example of the control of the fuel cell system of the present disclosure.

FIG. 4 is a flowchart illustrating another example of the control of the fuel cell system of the present disclosure. The movement speed detector measures a movement speed of the mobile body at a predetermined timing. The timing when the movement speed detector measures the movement speed of the mobile body is not particularly limited. The movement speed may be measured at predetermined time intervals or constantly. The controller determines whether the movement speed of the mobile body that is measured by the movement speed detector is lower than a predetermined first movement speed V1. When the controller determines that the movement speed is equal to or higher than the first movement speed V1, the controller controls the rotation speed of the air compressor to be equal to or higher than the first rotation speed R1. When the controller determines that the movement speed is lower than the first movement speed V1, the acceleration detector predicts an acceleration G. The controller determines whether the acceleration G predicted by the acceleration detector is equal to or higher than the acceleration threshold G1. When the controller determines that the acceleration G predicted by the acceleration detector is equal to or higher than the acceleration threshold G1, the controller controls the rotation speed of the air compressor to be equal to or higher than the first rotation speed R1. When the controller determines that the acceleration G predicted by the acceleration detector is lower than the acceleration threshold G1, the controller determines whether the movement speed is equal to or higher than a predetermined second movement speed V2 lower than the first movement speed V1. When the controller determines that the movement speed is equal to or higher than the second movement speed V2, the controller controls the rotation speed of the air compressor to be a predetermined third rotation speed R3 lower than the first rotation speed R1. When the controller determines that the movement speed is lower than the second movement speed V2, the controller controls the rotation speed of the air compressor to be the predetermined second rotation speed R2 lower than the third rotation speed R3. Then, the control may be terminated or repeated from the beginning. The timing to execute the second and subsequent control after the first control is not particularly limited. The control may be repeated constantly or at predetermined time intervals.

The third rotation speed R3 may be a rotation speed of the air compressor that is necessary when the movement speed of the mobile body is equal to or higher than the second movement speed V2 and lower than the first movement speed V1. When the third rotation speed R3 is set, the first rotation speed R1 may be a rotation speed of the air compressor that is necessary when the movement speed of the mobile body is equal to or higher than the first movement speed V1. When the third rotation speed R3 is set, the second rotation speed R2 may be a rotation speed of the air compressor that is necessary when the movement speed of the mobile body is lower than the second movement speed V2. That is, the rotation speeds are the second rotation speed R2, the third rotation speed R3, and the first rotation speed R1 (R2<R3<R1) in ascending order.

For example, the first movement speed V1 may be a movement speed when the mobile body is operating slowly at the predetermined slow speed. In this case, the second movement speed V2 may be equal to or higher than a movement speed when the mobile body is not stopped and lower than the slow speed. In this case, the first rotation speed R1 may be a rotation speed of the air compressor that is necessary when the mobile body is operating slowly. In this case, the third rotation speed R3 may be a rotation speed of the air compressor that is necessary when the movement speed is equal to or higher than the movement speed when the mobile body is not stopped and lower than the slow speed. In this case, the second rotation speed R2 may be the minimum rotation speed of the air compressor that is necessary when the mobile body is stopped.

For example, the first movement speed V1 may be the movement speed when the mobile body is in normal operation. In this case, the second movement speed V2 may be equal to or higher than the movement speed when the mobile body is not stopped and lower than the movement speed when the mobile body is in normal operation, or may be equal to or higher than the predetermined slow speed of the mobile body and lower than the movement speed when the mobile body is in normal operation. In this case, the first rotation speed R1 may be the rotation speed of the air compressor that is necessary when the mobile body is in normal operation. In this case, the third rotation speed R3 may be a rotation speed of the air compressor that is necessary when the movement speed of the mobile body is equal to or higher than the movement speed when the mobile body is not stopped and lower than the movement speed when the mobile body is in normal operation, or may be a rotation speed of the air compressor that is necessary when the movement speed of the mobile body is equal to or higher than the predetermined slow speed and lower than the movement speed when the mobile body is in normal operation. In this case, the second rotation speed R2 may be the minimum rotation speed of the air compressor that is necessary when the mobile body is stopped.

For example, the first movement speed V1 may be a movement speed when the mobile body is operating at a speed higher than the normal operation speed. In this case, the second movement speed V2 may be equal to or higher than the movement speed when the mobile body is not stopped and lower than the movement speed when the mobile body is operating at a high speed, or may be equal to or higher than the predetermined slow speed of the mobile body and lower than the movement speed when the mobile body is operating at a high speed. In this case, the first rotation speed R1 may be the rotation speed of the air compressor that is necessary when the mobile body is operating at a high speed. In this case, the third rotation speed R3 may be a rotation speed of the air compressor that is necessary when the movement speed of the mobile body is equal to or higher than the movement speed when the mobile body is not stopped and lower than the movement speed when the mobile body is operating at a high speed, or may be a rotation speed of the air compressor that is necessary when the movement speed of the mobile body is equal to or higher than the predetermined slow speed and lower than the movement speed when the mobile body is operating at a high speed. In this case, the second rotation speed R2 may be the minimum rotation speed of the air compressor that is necessary when the mobile body is stopped.

In the control illustrated in FIG. 4, for example, when the mobile body is a vehicle, the rotation speed of the air compressor can be controlled based on the movement speed of the vehicle and damage to the air compressor due to an insufficient rotation speed of the air compressor can be suppressed in the case where the vehicle is predicted to travel through a rough road or a wavy road, the vehicle is predicted to undergo road surface interference, or a minor collision is predicted to occur. Specifically, the rotation speed is controlled to be the first rotation speed R1 necessary to attenuate the acceleration G to suppress the damage to the air compressor in the case where the vehicle is predicted to travel through a rough road or a wavy road, the vehicle is predicted to undergo road surface interference, or a minor collision is predicted to occur. During traveling in which these situations are not predicted, the rotation speed is controlled to be the third rotation speed R3 that is the minimum rotation speed necessary during the traveling to improve the fuel efficiency of the vehicle. During a stop of the vehicle in which these situations are not predicted, the rotation speed is controlled to be the second rotation speed R2 to improve the fuel efficiency of the vehicle.

The presence or absence of a rough road, a wavy road, or road surface interference may be predicted by the acceleration detector based on, for example, road surface prediction information obtained by a combination of road surface information, lane information, and roadwork schedules with the Global Positioning System (GPS) and 3D maps. Examples of the road surface interference include a road surface gap during traveling. For example, when the mobile body is traveling on a downhill and there is no road surface gap on the downhill, determination may be made that the predicted acceleration G is lower than the acceleration threshold G1 and the rotation speed of the air compressor may be reduced from the first rotation speed R1 to the third rotation speed R3 before the mobile body enters the downhill to reduce the power consumption of the air compressor. When there is a road surface gap on the downhill, determination may be made that the predicted acceleration G along with traveling over the road surface gap is equal to or higher than the acceleration threshold G1 and the rotation speed of the air compressor may be increased from the third rotation speed R3 to the first rotation speed R1 before the mobile body enters the downhill to suppress damage to the air compressor.

As described above, in the fuel cell system of the present disclosure, the fuel efficiency of the mobile body can be improved by using the single air compressor and the durability of the air compressor can be improved regardless of whether the mobile body is moving or stopped.

What is claimed is:

1. A fuel cell system for a mobile body, the fuel cell system comprising:
   a fuel cell;
   an oxidant gas supply system configured to supply an oxidant gas to the fuel cell; and
   a controller, wherein:
   the oxidant gas supply system includes an air compressor;
   the air compressor includes a rotor, an air bearing, and a housing;
   the controller includes a movement speed detector configured to measure a movement speed of the mobile body, and an acceleration detector configured to predict an acceleration to be applied to the mobile body; and
   the controller is configured to
     determine whether the acceleration predicted by the acceleration detector is equal to or higher than a predetermined acceleration threshold, and
     control a rotation speed of the air compressor to be equal to or higher than a predetermined first rotation speed when determination is made that the acceleration predicted by the acceleration detector is equal to or higher than the acceleration threshold.

2. The fuel cell system according to claim 1, wherein the controller is configured to
   determine whether the rotation speed of the air compressor is equal to or higher than a predetermined second rotation speed and lower than the first rotation speed,
   determine whether the acceleration predicted by the acceleration detector is equal to or higher than the acceleration threshold when determination is made that the rotation speed of the air compressor is equal to or higher than the second rotation speed and lower than the first rotation speed,
   control the rotation speed of the air compressor to be equal to or higher than the first rotation speed when determination is made that the acceleration predicted by the acceleration detector is equal to or higher than the acceleration threshold, and
   control the rotation speed of the air compressor to be the second rotation speed when determination is made that the acceleration predicted by the acceleration detector is lower than the acceleration threshold.

3. The fuel cell system according to claim 1, wherein the controller is configured to
   determine whether the movement speed of the mobile body that is measured by the movement speed detector is lower than a predetermined first movement speed,
   control the rotation speed of the air compressor to be equal to or higher than the first rotation speed when determination is made that the movement speed is equal to or higher than the first movement speed,
   determine whether the acceleration predicted by the acceleration detector is equal to or higher than the acceleration threshold when determination is made that the movement speed is lower than the first movement speed, and
   control the rotation speed of the air compressor to be equal to or higher than the first rotation speed when determination is made that the acceleration predicted by the acceleration detector is equal to or higher than the acceleration threshold.

4. The fuel cell system according to claim 1, wherein the controller is configured to
   determine whether the movement speed is equal to or higher than a predetermined second movement speed lower than a first movement speed when determination is made that the acceleration predicted by the acceleration detector is lower than the acceleration threshold,
   control the rotation speed of the air compressor to be a predetermined third rotation speed lower than the first rotation speed when determination is made that the movement speed is equal to or higher than the second movement speed, and
   control the rotation speed of the air compressor to be a predetermined second rotation speed lower than the third rotation speed when determination is made that the movement speed is lower than the second movement speed.

5. The fuel cell system according to claim 2, wherein the second rotation speed is a minimum rotation speed of the air compressor that is necessary when the mobile body is stopped.

6. The fuel cell system according to claim 4, wherein the third rotation speed is a rotation speed of the air compressor that is necessary when the movement speed of the mobile body is equal to or higher than the second movement speed and lower than the first movement speed.

7. A control device for a fuel cell system including a fuel cell and an oxidant gas supply system including an air compressor and configured to supply an oxidant gas to the fuel cell, the fuel cell system being mountable on a mobile body, the control device comprising:
- a movement speed detector configured to measure a movement speed of the mobile body; and
- an acceleration detector configured to predict an acceleration to be applied to the mobile body, wherein the control device is configured to
- determine whether the acceleration predicted by the acceleration detector is equal to or higher than a predetermined acceleration threshold, and
- control a rotation speed of the air compressor to be equal to or higher than a predetermined first rotation speed when determination is made that the acceleration predicted by the acceleration detector is equal to or higher than the acceleration threshold.

8. The control device according to claim 7, wherein the control device is configured to
- determine whether the rotation speed of the air compressor is equal to or higher than a predetermined second rotation speed and lower than the first rotation speed,
- determine whether the acceleration predicted by the acceleration detector is equal to or higher than the acceleration threshold when determination is made that the rotation speed of the air compressor is equal to or higher than the second rotation speed and lower than the first rotation speed,
- control the rotation speed of the air compressor to be equal to or higher than the first rotation speed when determination is made that the acceleration predicted by the acceleration detector is equal to or higher than the acceleration threshold, and
- control the rotation speed of the air compressor to be the second rotation speed when determination is made that the acceleration predicted by the acceleration detector is lower than the acceleration threshold.

9. The control device according to claim 7, wherein the control device is configured to
- determine whether the movement speed of the mobile body that is measured by the movement speed detector is lower than a predetermined first movement speed,
- control the rotation speed of the air compressor to be equal to or higher than the first rotation speed when determination is made that the movement speed is equal to or higher than the first movement speed,
- determine whether the acceleration predicted by the acceleration detector is equal to or higher than the acceleration threshold when determination is made that the movement speed is lower than the first movement speed, and
- control the rotation speed of the air compressor to be equal to or higher than the first rotation speed when determination is made that the acceleration predicted by the acceleration detector is equal to or higher than the acceleration threshold.

10. The control device according to claim 7, wherein the control device is configured to
- determine whether the movement speed is equal to or higher than a predetermined second movement speed lower than a first movement speed when determination is made that the acceleration predicted by the acceleration detector is lower than the acceleration threshold,
- control the rotation speed of the air compressor to be a predetermined third rotation speed lower than the first rotation speed when determination is made that the movement speed is equal to or higher than the second movement speed, and
- control the rotation speed of the air compressor to be a predetermined second rotation speed lower than the third rotation speed when determination is made that the movement speed is lower than the second movement speed.

11. The control device according to claim 8, wherein the second rotation speed is a minimum rotation speed of the air compressor that is necessary when the mobile body is stopped.

12. The control device according to claim 10, wherein the third rotation speed is a rotation speed of the air compressor that is necessary when the movement speed of the mobile body is equal to or higher than the second movement speed and lower than the first movement speed.

13. A mobile body comprising the fuel cell system according to claim 1.

14. A mobile body comprising the control device according to claim 7.

* * * * *